May 6, 1969    I. L. PHILLIPS ET AL    3,442,221
APPARATUS FOR PRECISION PLANTING OF SEEDS
Filed Jan. 14, 1966
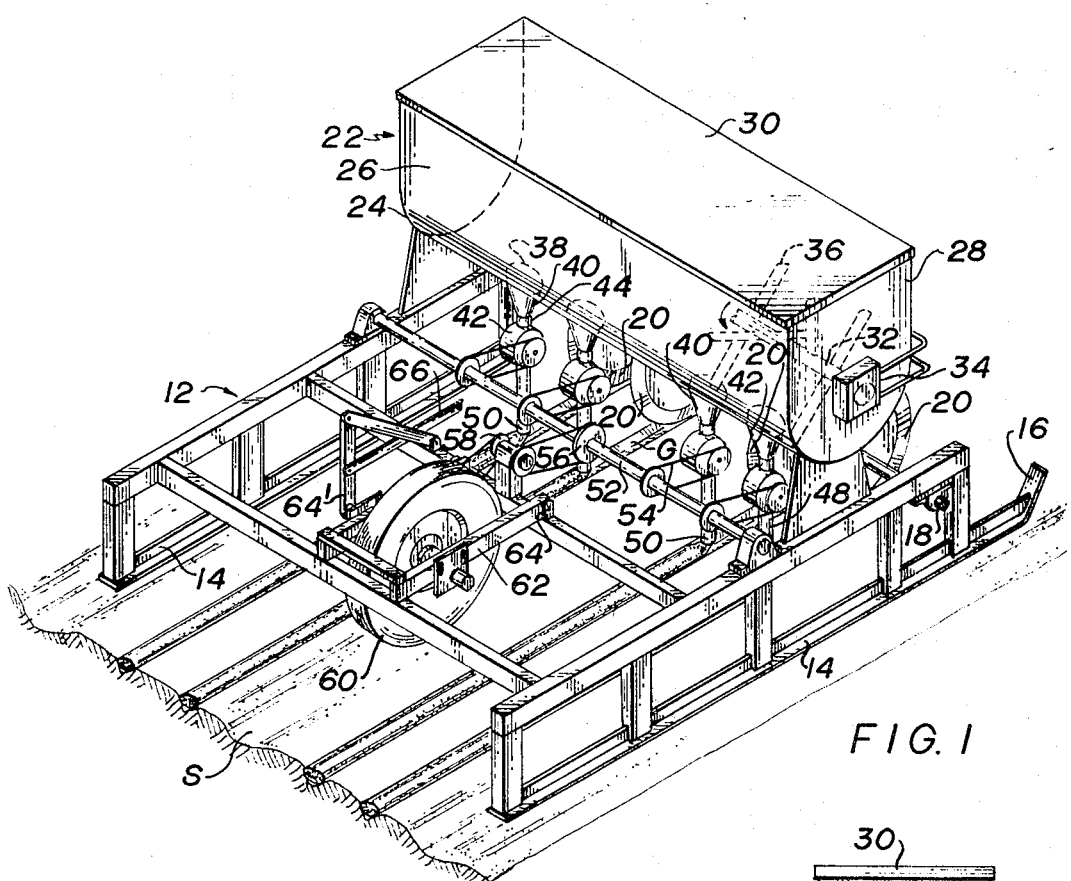
FIG. 1
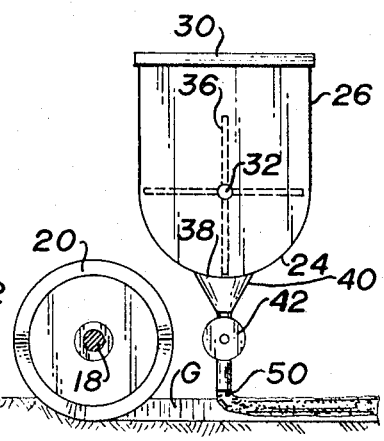
FIG. 2
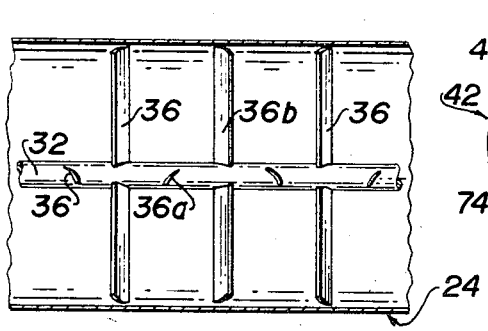
FIG. 3
FIG. 4
INVENTOR.
IRVINE L. PHILLIPS
DAVID B. SCOTT
JAMES M. THOMPSON
Townsend and Townsend
ATTORNEYS

United States Patent Office 3,442,221
Patented May 6, 1969

3,442,221
APPARATUS FOR PRECISION PLANTING OF SEEDS
Irvine L. Phillips, David B. Scott, and James M. Thompson, Salinas, Calif., assignors to Soilserv, Inc., Salinas, Calif.
Filed Jan. 14, 1966, Ser. No. 520,806
Int. Cl. F04c 5/00
U.S. Cl. 103—117                               1 Claim

ABSTRACT OF THE DISCLOSURE

Seed planting mobile unit having a member for forming a channel at the top of a seed bed and an extrusion device for depositing a viscous seed containing mass into the channel. The extrusion device includes a pump having a chamber within which a rotatably driven impeller is mounted. The impeller has flexible blades which slidably engage the chamber surface. A portion of the chamber surface is cammed to distort the flexible blades so that a volume decrease is created ahead of the blade as it is distorted to thereby force viscous seed containing mass outwardly and into the channel in the seed bed.

---

This invention relates to apparatus of the type adapted for movement over a seed bed to plant or deposit seeds and nutrients therefor in a precise pattern in the bed.

In copending application Ser. No. 510,747 filed Dec. 1, 1965 now Patent No. 3,351,031 and entitled, improved Planting Method there is described a method for planting seeds in a seed bed. The present invention is directed to improved apparatus for practicing said method. Apparatus according to the present invention includes a container for storing and mixing an agglomeration of seeds and viscous plant nutrient constituents. The container has one or more discharge openings, each such opening having associated therewith a displacement pump for conducting the viscous agglomeration from the container. Such pump feeds into a discharge tube having a nozzle opening spaced above the surface of the seed bed. The apparatus includes a device that travels over the seed bed ahead of such nozzle opening for forming a groove or depression in the seed bed and which groove or depression is of such size that the viscous material extruded from the nozzle will enter the depression and more or less fill the depression to the surface of the seed bed.

The principal object of the present invention is to provide apparatus movable over a seed bed for planting the seed bed by forming one or more grooves in the seed bed for receipt of a seed-viscous constituent agglomeration. The invention also includes apparatus for mixing the agglomeration and apparatus for pumping the agglomeration into the groove formed in the seed bed.

Another object is to provide a container for storing and mixing seeds and viscous constituents into a homogeneous agglomeration. This object is attained by providing a container having a semi-cylindric bottom wall and a plurality of blades or vanes driven about an axis co-extensive with the cylindric axis of the semi-cylindric surface. The vanes are disposed obliquely relative to their direction of rotative movement with alternate blades being oriented oppositely. It has been found that such structure agitates the seed-viscous constituent agglomeration so as to distribute the seeds and the viscous constituents in a uniform manner. Consequently, the viscous material extruded from the nozzle opening contains the seeds in uniform distribution therein.

Still another object of the present invention is to provide a displacement pump for viscous material that is capable of substantially steady delivery rates of very viscous, heavy material. This object is accomplished by providing a circumferentially sloped ramp which extends inwardly of the internal cylindric surface of the pump in the direction of forward movement of the impeller blades with respect to such cylindric surface. The ramp is disposed proximate the discharge opening of the pump as a consequence of which the viscous material is efficiently forced from the discharge opening.

As more fully explained in the above-cited copending application a novel technique for planting a seed bed affords uniform spacing of the seeds and uniform nourishment of the seeds at least during the initial stages of germination and growth. Such characteristics of the novel technique provide substantially simultaneous germination of all seeds in a particular field and substantially simultaneous maturing or ripening of the crop produced by the seeds. Uniform ripening of the crop materially increases the yield because the entire crop will be in an optimum condition for a single harvesting operation.

The technique employs a viscous agglomeration that includes agricultural chemicals, nutrients, humectants and the like. The seeds are uniformly distributed throughout the agglomeration and such mixture is then disposed in grooves in the seed bed in a continuous snake-like form in which each individual seed is surrounded by an identical chemical environment. The apparatus of the present invention includes, in efficient combination, the elements for accomplishing the foregoing planting technique.

These and other objects will be more apparent after referring to the following specification and accompanying drawing in which:

FIG. 1 is a perspective view of the apparatus of the present invention;

FIG. 2 is a partial side elevation view of the apparatus of FIG. 1;

FIG. 3 is a partially schematic side elevation view of a viscous material displacement pump constructed according to the present invention; and FIG. 4 is a plan view of a portion of the agitating blade structure of the present invention.

Referring more particularly to the drawing, reference numeral 12 indicates a frame for supporting the apparatus, the frame including longitudinally extending runners 14 having turned-up portions 16 at the front end thereof for supporting the frame for movement on a seed bed surface S. A shaft 18 is mounted on frame 12 adjacent the forward end thereof and extends transversely of the frame to carry one or more discs 20 (four discs are shown in the exemplary apparatus of FIG. 1) which discs form grooves G in the seed bed surface. Grooves G can be formed in a generally triangular form as shown in the drawing, in which case the periphery of each disc 20 has a complementary V-shape, and the disc has a radius sufficient to form the grooves to the desired depth. Alternate expedients for forming one or more grooves G in the seed bed will occur to those skilled in the art, the showing herein of discs 20 as the groove-forming means being only by was of example and not by way of limitation.

Rearwardly of the groove-forming structure constituted by shaft 18 and discs 20 is a container 22 for receiving and mixing seeds and viscous constituents therein. As more fully explained in the above-cited copending application, the viscous constituents include agricultural chemicals, nutrients, humectants and like materials. Container 22 includes a semi-cylindric bottom wall 24 tangent with which forward and rear walls 26 extend upwardly. Side walls 28 and an openable cover 30 complete the container.

Spanning side walls 28 is a driven shaft 32 which is mounted for rotation coaxially with the cylindric axis of semi-cylindric wall surface 24. An hydraulic motor or the like 34 is provide for rotatively driving shaft 32 and is supplied with hydraulic fluid under pressure from a source not shown, such fluid pressure source typically being mounted on a tractor used for drawing the apparatus over the seed bed. Radiating from shaft 32 and spaced more or less uniformly therealong and therearound within container 22 is a plurality of agitating blades 36. As seen most clearly in FIG. 4, blades 36 are oriented obliquely of their direction of rotative movement with alternate blades being oriented oppositely. More particularly, and in reference to FIG. 4, blade 36a is oriented so as to urge seeds and viscous constituents contacted by it in a right-hand direction as viewed in the figure, whereas blade 36b is oriented so as to urge materials that it contacts in a left-hand direction as viewed in the figure. The ends of the blades extend sufficiently close to cylindric wall 24 that substantially all of the material within container 22 will be subjected to agitation by the blades. It has been found that the blade arrangement described by way of example next above, effects uniform and homogeneous distribution of the seeds and viscous constituents carried in container 22.

Semi-cylindric wall 24 has formed in the bottom portion thereof an outlet opening 38 associated with each groove-forming disc 20. A plurality of conduits 40, each of which has downwardly converging side walls, is mounted to wall 24, individual conduits being in communication with respective outlet openings 38. Conduits 40 are shown by way of example in the drawing as defining a frusto-conical shape. At the lower or exit end of each conduit 40 a displacement pump 42 is mounted with the inlet opening 44 thereof in fluid communication with the exit opening of conduit 40. Pump 42 includes a discharge opening 46 and is adapted to pump or convey viscous material fed to inlet opening 44 to discharge opening 46. A discharge tube 48 is mounted in fluid communication with pump discharge opening 46, the discharge tube terminating at the lower end thereof in a nozzle opening 50 disposed in longitudinal alignment with groove-forming disc 20. Seeds and viscous constituents will be discharged in snake-like form from the nozzle opening and will thus be deposited in groove G.

A shaft 52 is journaled in frame 14 transversely thereof and is connected in driving relation to each pump 42 through a chain-sprocket drive train 54. Shaft 52 has a driven sprocket 56 which is rotatively driven through a chain-sprocket drive train 58 from a ground contacting wheel 60. The wheel 60 is rotated by contact with seed bed S as the apparatus is drawn over the surface of the seed bed. Wheel 60 is carried on a U-frame 62, which U-frame is pivotally mounted at 64 to the main frame of the apparatus to permit the wheel to be lifted out of contact with the seed bed surface when it is desired to terminae delivery of viscous constituents from nozzle opening 50. A lever system 64' provided with a control rod 66 (the forward end, not shown, of which is accessible to the tractor operator through conventional linkages) affords controlled pivotal movement of U-frame 62 and consequent control of the discharge of materials into groove G through activation and deactivation of pumps 42.

The seed-viscous constituent agglomeration typically distributed by the apparatus of this invention is of extremely high viscosity. To afford efficient and continuous delivery of the material to nozzle 50, we have invented an improvement for an impeller type displacement pump. With reference to FIG. 3, pump 42 having a shaft 68 driven from chain-sprocket drive train 54, is shown having a plurality of blades or vanes 70 radiating outwardly from the shaft, the outer extremity of the vanes being formed with enlarged bearing portions 72 which slide over the internal surface of the pump housing in a substantially fluid-tight manner. In certain commercially available pumps the impeller includes blades 70 and enlarged portions 72 formed of neoprene or the like, in a unitary structure. According to the present invention a cam-like member 74 is employed and is formed interior of pump 42 adjacent and upstream of discharge opening 46 to gradually decrease the radius of the pump housing interior upstream of the pump discharge opening. Cam member 74 is relieved or terminated at 76 to afford egress of the viscous material through the discharge opening.

Operation of our improved pump can better be appreciated by reference to FIG. 3, wherein blade or vane 70a is shown as being distorted convexly by the cam member 74 in the direction of forward impeller rotation, i.e., a downstream direction. Consequently, the volume between blade 70a and blade 70b immediately ahead thereof is decreased as blade 70a transverses the inner surface of cam member 74. Accordingly, even the most viscous material disposed in the volume between blades 70a and 70b will be displaced into discharge opening 46 as shaft 68 rotates to move vane 70a along cam member 74. Obviously each of the inter-blade volumes will experience a similar reduction in volume as such volumes go through the phase depicted in FIG. 3 in connection with blades 70a and 70b.

In operation the apparatus of the present invention is made ready for planting by placing in container 22 the requisite seeds and viscous constituents. Because shaft 32 is driven continuously by hydraulic motor 34, agitator blades 36 continuously agitate or mix the contents of the container independently of movement of the apparatus. The apparatus is then moved to a previously prepared seed bed and is drawn over the seed bed by a tractor or like pulling vehicle. As the apparatus passes the edge of the seed bed pumps 42 are activated by lowering wheel 60 into ground contact through appropriate manipulation of control rod 66. As a result of such action, shaft 52 will be driven through chain-sprocket drive train 58, thus driving each displacement pump 42 so as to convey the seed viscous constituent agglomeration from container 22 to the respective discharge nozzles 50. The seed containing viscous material is discharged or extruded into grooves G formed by discs 20 as the apparatus is drawn over the seed bed. Obviously, at the end of a pass of the apparatus over the seed bed, control rod 66 is manipulated by the operator to raise wheel 60 from contact with the ground so as to interrupt discharge of the material from discharge nozzles 50. The orientation of blades 36 as described above, together with the continuous actuation of the blades, assures that the seeds and viscous constituents within container 22 will be uniformly distributed. The consequence of such uniform distribution is that composition of materials planted in an entire field will be uniform, thus assuring simultaneous germination and maturing of the crop. The cam or ramp member 74 incorporated into pump 42 plays an important role in assuring such uniformity, in that the extremely viscous materials are delivered at a positive and steady rate through discharge nozzle 50.

Although one embodiment of the invention has been shown and described, it will be apparent that other adaptations and modifications can be made without departing from the true spirit and scope of the invention.

What is claimed is:

1. A displacement pump comprising means defining a chamber having a generally cylindric surface with an inlet and an outlet opening therein, a rotatively driven impeller within the chamber having a plurality of flexible blades for slidable engagement with the cylindric surface, thereby defining a material transporting volume intermediate each contiguous pair of blades, and means for decreasing said volume when the volume is in fluid communication with the outlet opening, said volume decreasing means comprising means defining a cam surface within said chamber adjacent and upstream of said discharge opening, said cam defining a forwardly, inwardly sloping surface portion in alignment with said cylindric surface to distort convexly forwardly the vanes as they pass over said cam so that a volume ahead of a distorted blade is decreased when in communication with said outlet opening.

References Cited

UNITED STATES PATENTS

| | | | |
|---|---|---|---|
| 2,636,479 | 4/1953 | Smyser. | |
| 2,843,049 | 7/1958 | Sherwood. | |
| 3,149,588 | 9/1964 | Gatzke | 111—7 |
| 3,322,080 | 5/1967 | Gatzke et al. | 111—1 |
| 3,351,031 | 11/1967 | Phillips et al. | 111—1 |
| 3,130,694 | 4/1964 | Gatzke | 111—7 |

ANTONIO F. GUIDA, *Primary Examiner.*

STEPHEN C. PELLEGRINO, *Assistant Examiner.*